(12) United States Patent
Huang

(10) Patent No.: US 8,905,379 B2
(45) Date of Patent: Dec. 9, 2014

(54) TIE-DOWN DEVICE

(71) Applicant: Han-Ching Huang, Taichung (TW)

(72) Inventor: Han-Ching Huang, Taichung (TW)

( * ) Notice: Subject to any disclaimer, the term of this patent is extended or adjusted under 35 U.S.C. 154(b) by 28 days.

(21) Appl. No.: 13/783,271

(22) Filed: Mar. 2, 2013

(65) Prior Publication Data

US 2014/0246533 A1   Sep. 4, 2014

(51) Int. Cl.
*B21F 9/00* (2006.01)
*B66D 3/00* (2006.01)
*B65H 75/44* (2006.01)

(52) U.S. Cl.
CPC .................................. *B65H 75/4457* (2013.01)
USPC ............ 254/219; 254/218; 254/239; 254/344

(58) Field of Classification Search
USPC .......................... 254/218, 219, 239, 241, 344
See application file for complete search history.

(56) References Cited

U.S. PATENT DOCUMENTS

| | | | |
|---|---|---|---|
| 2,146,104 A * | 2/1939 | Adamson | 254/218 |
| 3,600,977 A * | 8/1971 | Bogie | 475/343 |
| 3,885,656 A * | 5/1975 | Michling et al. | 192/225 |
| 5,769,345 A * | 6/1998 | Morner et al. | 242/375.3 |
| 6,007,053 A * | 12/1999 | Huang | 254/247 |
| 6,609,275 B1 * | 8/2003 | Lin | 24/68 CD |
| 7,100,902 B1 * | 9/2006 | Lu | 254/218 |
| 7,350,767 B2 * | 4/2008 | Huang | 254/218 |
| 7,789,603 B2 * | 9/2010 | Huck | 410/100 |
| 7,874,047 B2 * | 1/2011 | Breeden | 24/68 CD |
| 8,312,601 B2 * | 11/2012 | Huang | 24/68 CD |
| 8,651,509 B1 * | 2/2014 | Huang | 280/480.1 |
| 2004/0155230 A1 * | 8/2004 | Fortin | 254/219 |
| 2006/0180800 A1 * | 8/2006 | Tremblay | 254/229 |
| 2006/0197072 A1 * | 9/2006 | Huang | 254/217 |

* cited by examiner

*Primary Examiner* — Emmanuel M Marcelo

(57) ABSTRACT

A tie-down device includes a frame, a strap, a reeling unit, a driving unit and a gear box. The frame includes two walls extending from a base. The reeling unit includes a reel rotationally supported on the walls for reeling the strap. The driving unit is supported on the first wall. The gearbox connects the driving unit to the reeling unit.

9 Claims, 8 Drawing Sheets

TIE-DOWN DEVICE

BACKGROUND OF INVENTION

1. Field of Invention

The present invention relates to a tie-down device and, more particularly, to a tie-down device equipped with a speed-increasing gearbox.

2. Related Prior Art

As disclosed in U.S. Pat. Nos. 5,611,520, 7,100,902 and 8,172,203, a tie-down device includes a frame, two axles and a knob. The frame includes two separate walls extending from a base. The axles are supported on the walls. The knob is connected to an end of one of the axles that extends beyond one of the walls. The knob is operable to wind a strap onto the axle that is connected thereto. However, the winding of the strap onto the axle is troublesome and slow.

As disclosed in U.S. Pat. No. 6,609,275, a tie-down device includes a frame, an axle, a reel and a coil spring. The axle is non-rotationally supported on the frame. The reel is rotationally provided around the axle. The coil spring includes an end connected to the axle and another end connected to the reel. The coil spring is loaded as a strap is unwound from the reel. The strap can be wound onto the reel by the coil spring. The wind of the strap onto the reel is automatic. However, the diameter of the coil spring is large as the strap is long. That is, a large coil spring requires a lot of steel which is heavy and expensive.

Therefore, the present invention is intended to obviate or at least alleviate the problems encountered in prior art.

SUMMARY OF INVENTION

It is the primary objective of the present invention to provide a light tie-down device that winds a strap fast.

To achieve the foregoing objective, the tie-down device includes a frame, a strap, a reeling unit, a driving unit and a gear box. The frame includes two walls extending from a base. The reeling unit includes a reel rotationally supported on the walls for reeling the strap. The driving unit is supported on the first wall. The gearbox connects the driving unit to the reeling unit.

Other objectives, advantages and features of the present invention will be apparent from the following description referring to the attached drawings.

BRIEF DESCRIPTION OF DRAWINGS

The present invention will be described via detailed illustration of embodiments referring to the drawings wherein.

DETAILED DESCRIPTION OF EMBODIMENTS

Figure 1:
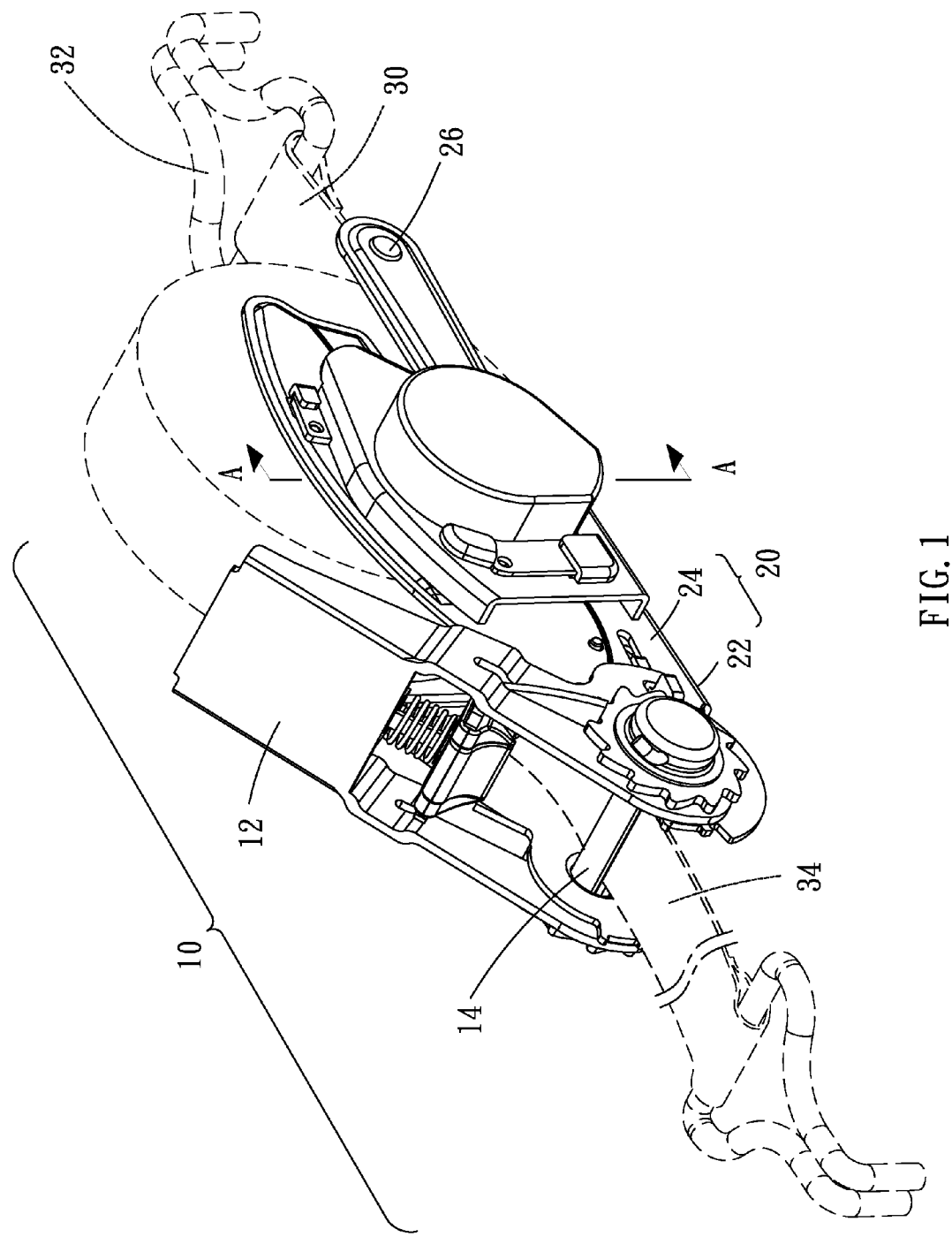
FIG. 1 is a perspective view of a tie-down device according to a first embodiment of the present invention.
Figure 2:
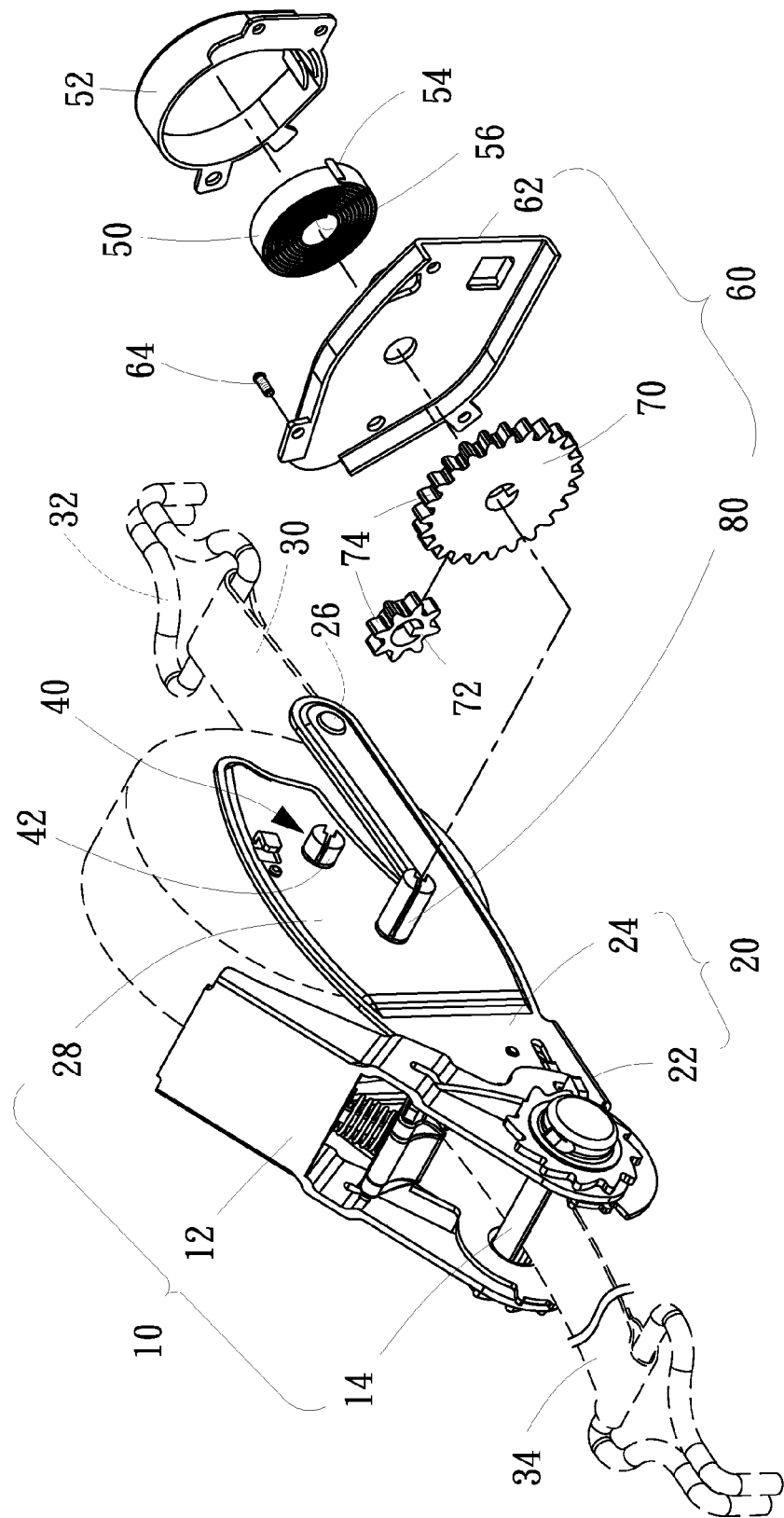
FIG. 2 is an exploded view of the tie-down device of FIG. 1.
Figure 3:
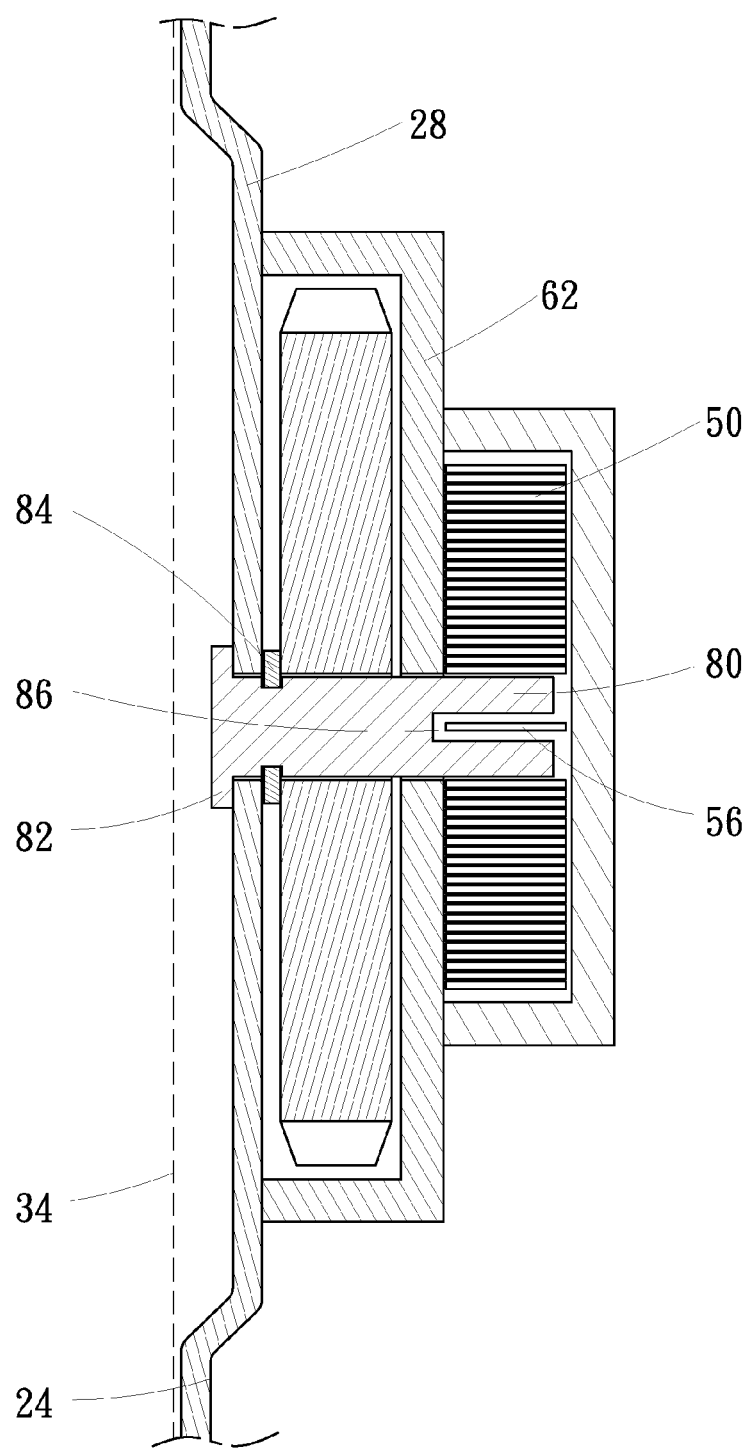
FIG. 3 is a cross-sectional view of the tie-down device of FIG. 1.
Figure 4:
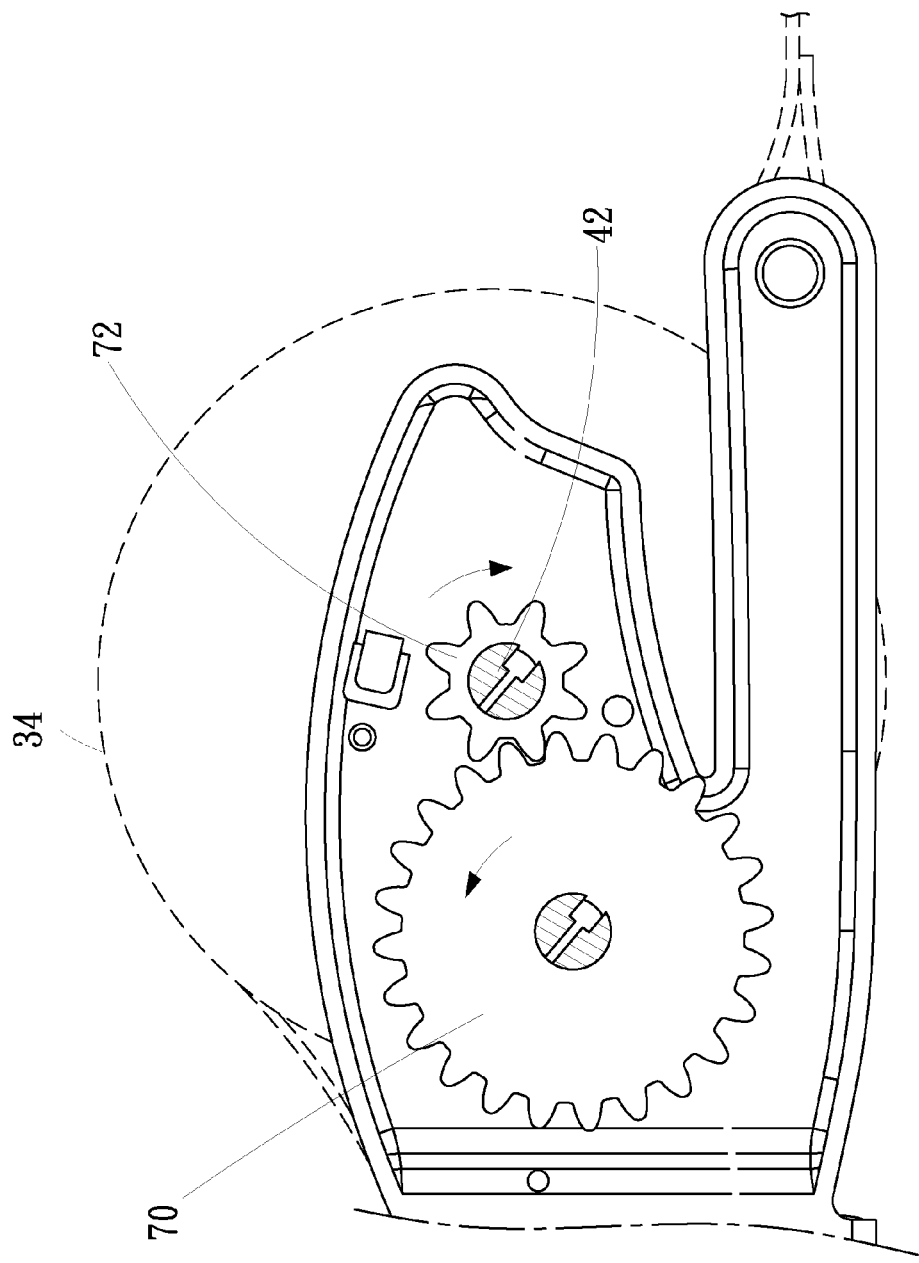
FIG. 4 is another cross-sectional view of the tie-down device shown in FIG. 1.

Referring to FIGS. 1 through 4, there is shown a tie-down device 10 according to a first embodiment of the present invention. The tie-down device 10 includes a frame 20, an axle 14, a handle 12, a reeling unit 40, a driving unit and a speed-increasing gearbox 60. The frame 20 includes a base 22, two separate walls 24 and a bar 26. The walls 24 are formed on the base 22. One of the walls 24 is formed with an outwardly protrusive portion 28. The bar 26 is connected to both of the walls 24 for reinforcing the frame 20. A short strap 30 includes an end connected to the bar 26 and another end connected to a hook 32.

The handle 12 is connected to the axle 14. The axle 14 is supported on the walls 24 rotationally. A long strap 34 includes an end connected to the reeling unit 40 and another end connected to a hook 32. The long strap 34 is inserted via a slot defined in the axle 14. The long strap 34 can be wound onto the axle 14 by operating the handle 12.

The reeling unit 40 includes a reel 42 rotationally supported on the walls 24.

The speed-increasing gearbox 60 includes a shell 62, a large gear 70, a small gear 72 and an axle 80. The axle 80 is rotationally supported on the walls 24. The axle 80 includes a butt 82 formed at an end and a slit 86 defined in an opposite end. A clip 84 is placed in a groove defined in the axle 80 near the butt 82. The butt 82 is placed against an internal side of the outwardly protrusive portion 28 of the wall 24 while a clip 84 is placed against an external side of the same to keep the axle 80 on the outwardly protrusive portion 28 of the wall 24.

The large gear 70 is secured to the axle 80 so that they are rotatable together. The small gear 72 is secured to the reel 42 so that they are rotatable together. The small gear 72 is meshed with the large gear 70. Preferably, the large gear 70 includes teeth three times as many as the small gear 72 so that the small gear 72 rotates for three rounds as the large gear 70 rotates for one round.

The large gear 70 and the small gear 72 are protectively covered by the shell 62. Screws 64 are used to connect the shell 62 to the wall 24 that is formed with the outwardly protrusive portion 28.

The driving unit includes a coil spring 50 and a cover 52. The coil spring 50 includes an external end 54 hooking a tab extending from an internal side of the cover 52 and an internal end 56 extending through a slit 86 defined in the axle 80. The cover 52 is connected to the wall 24 that is formed with the outwardly protrusive portion 28.

The coil spring 50 is loaded as the long strap 34 is unwound from the reel 42. The long strap 34 can be wound onto the reel 42 by the coil spring 50 via the speed-increasing gearbox 60. The coil spring 50 does not have to be long to wind a long strap onto the reel 42 due to the use of the speed-increasing gearbox 60. The coil spring 50 can be small and light. The coil spring 50 requires only a small amount of steel and is hence inexpensive.

Figure 5:
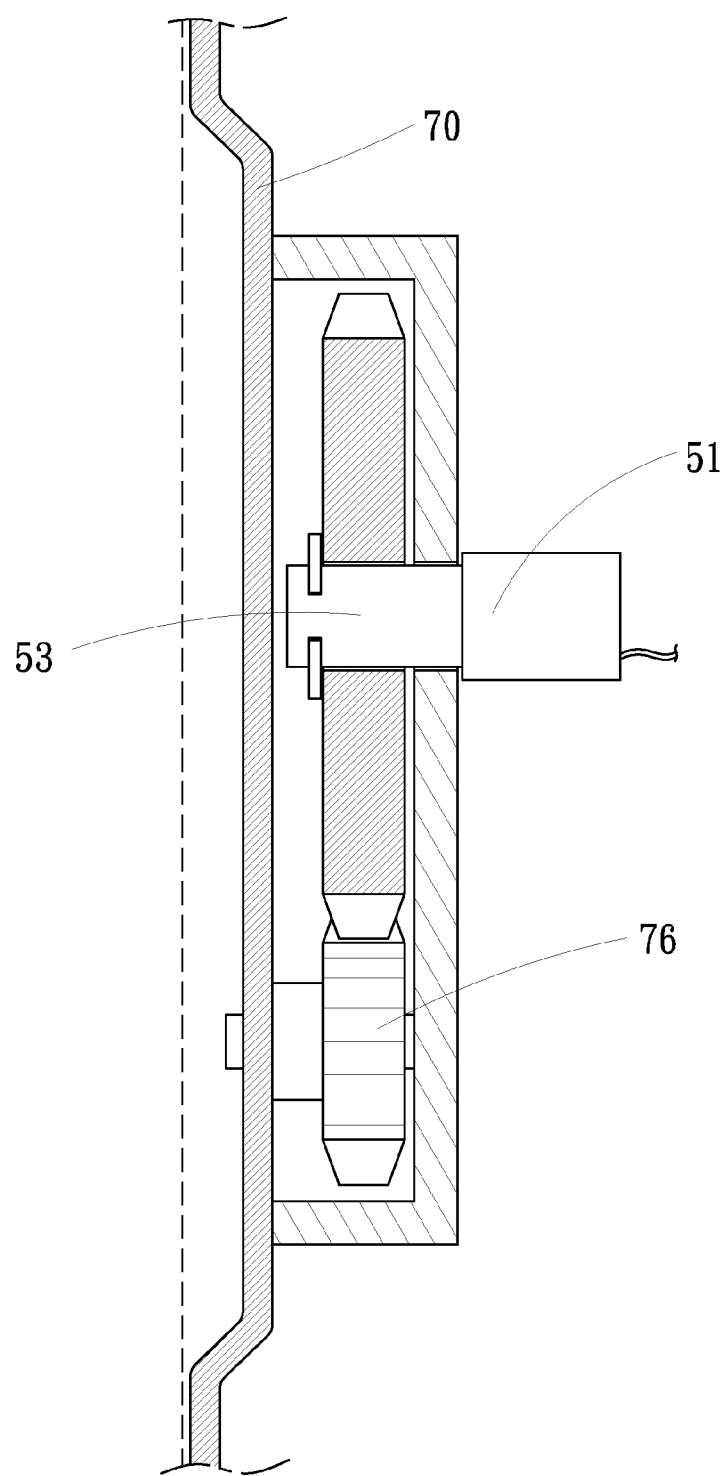
FIG. 5 is a cross-sectional view of a tie-down device according to a second embodiment of the present invention.
Figure 6:
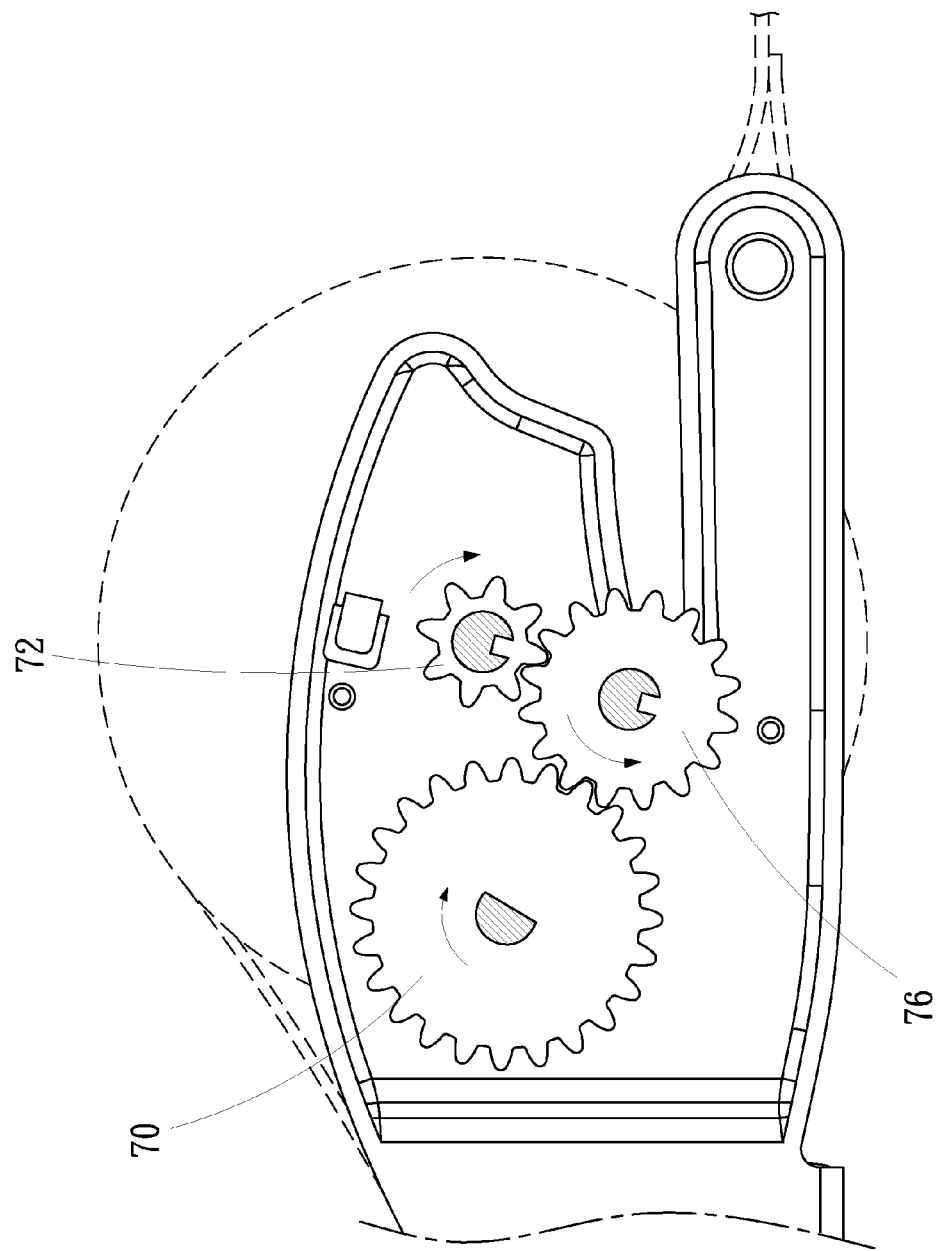
FIG. 6 is another cross-sectional view of the tie-down device shown in FIG. 5.

Referring to FIGS. 5 and 6, there is shown a tie-down device according to a second embodiment of the present invention. The second embodiment is like the first embodiment except several things. At first, there is used a motor 51 instead of the coil spring 50. The motor 51 is connected to the cover 52. The large gear 70 is connected to a mandrel 53 of the motor 51. Secondly, there is used a medium gear 76 between the large gear 70 and the small gear 72. Preferably, the large gear 70 includes twenty-four teeth, the medium gear 76 includes sixteen teeth, and the small gear 72 includes eight teeth so that the small gear 72 rotates for three rounds as the large gear 70 rotates for one round. Thirdly, the axle 80 is omitted. Fourthly, the cover 52 is omitted.

Figure 7:
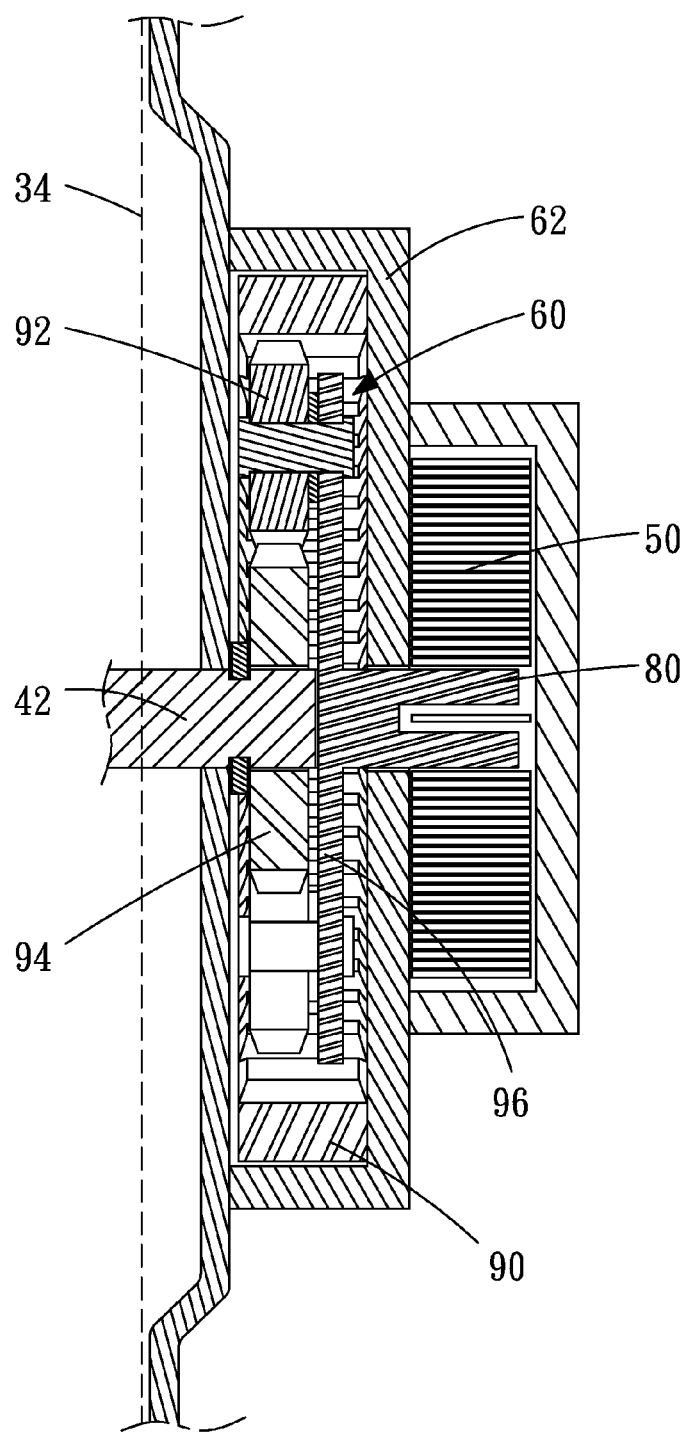
FIG. 7 is a cross-sectional view of a tie-down device according to a third embodiment of the present invention.
Figure 8:
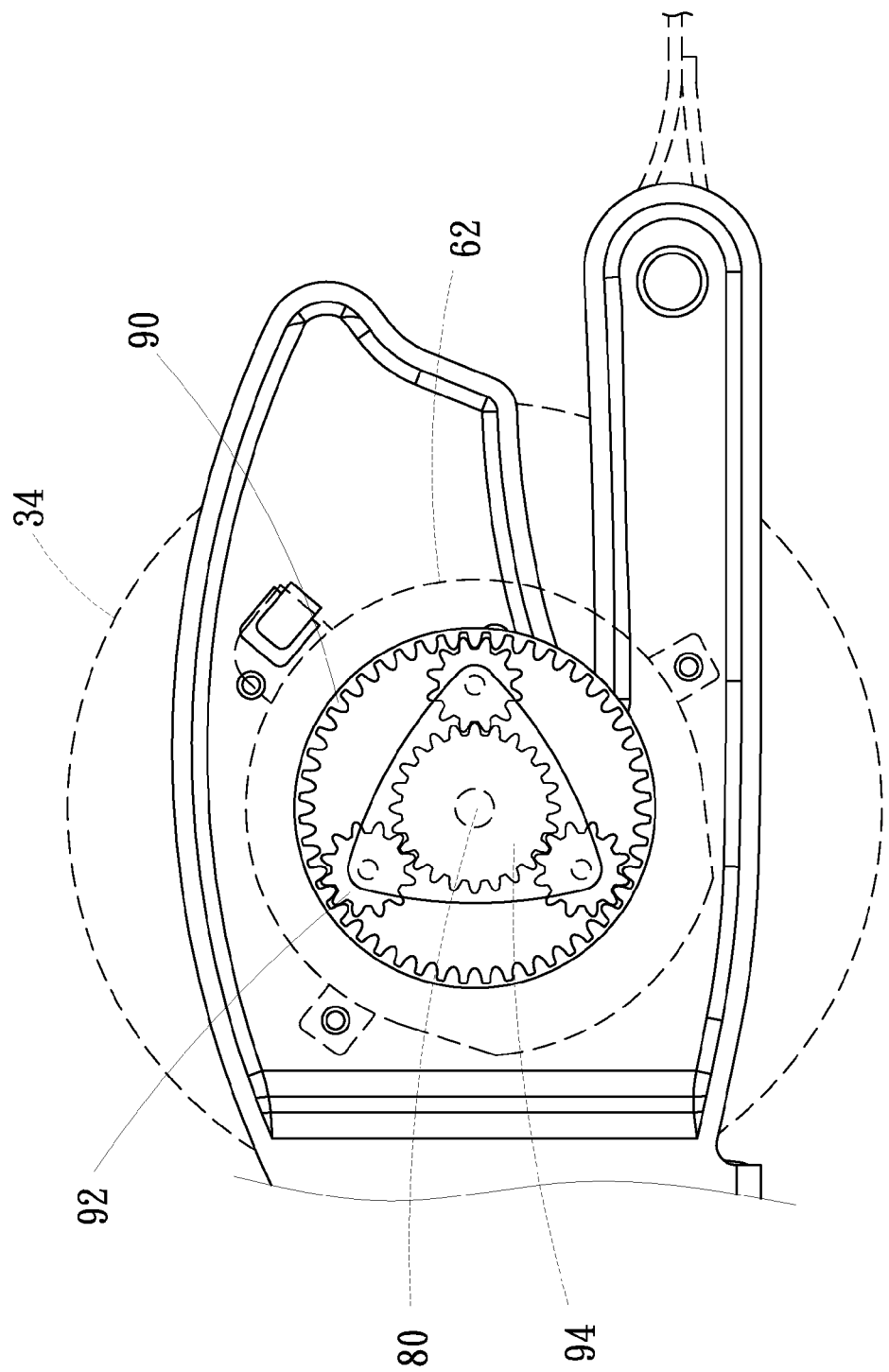
FIG. 8 is another cross-sectional view of the tie-down device shown in FIG. 7.

Referring to FIGS. 7 and 8, there is shown a tie-down device according to a third embodiment of the present invention. The third embodiment is like the first embodiment except that speed-increasing gearbox 60 includes a planetary gear train instead of the large gear 70 and the small gear 72. The planetary gear train inherently includes an internal gear 90, several planetary gears 92, a sun gear 94 and a carrier 96. Preferably, there are three planetary gears 92. The planetary gears 92 and the sun gear 94 are rotationally supported on the carrier 96. Each of the planetary gears 92 is meshed with the internal gear 90 and the sun gear 94.

The internal gear 90 is non-rotationally placed in the shell 62. The carrier 96 is connected to the axle 80 so that they are rotatable together. The sun gear 94 is connected to the reel 42 so that they are rotatable together.

The coil spring 50 rotates the axle 80 as well as the carrier 96. The carrier 96 rotates the sun gear 94 as well as the reel 42 via the planetary gears 92. The axles 80 and 42 rotate in a same direction.

Preferably, the internal gear 90 includes forty-eight teeth, each of the planetary gears 92 includes twelve gears, and the sun gear 94 includes twenty-four teeth. Thus, the sun gear 94 rotates for four rounds as the carrier 96 rotates one round.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A tie-down device including:
   a frame including a base and first and second walls extending from the base;
   a strap;
   a reeling unit including a reel rotationally supported on the first and second walls for reeling the strap;
   a driving unit supported on the first wall; and
   a speed-increasing gearbox including:
      a small gear connected to the reel so that they are rotatable together;
      a large gear engaged with the small gear and connected to the driving unit;
      an axle formed with a butt, rotationally supported on the first wall, and connected to the large gear so that they are rotatable together; and
      a clip fit on the axle, wherein the clip is placed against a side of the first wall while the butt is placed against an opposite side of the first wall, thus retaining the axle on the first wall.

2. The tie-down device according to claim 1, wherein the driving unit includes a coil spring connected to the first wall at an end and connected to the reel at another end.

3. The tie-down device according to claim 2, wherein the driving unit further includes a cover attached to the first wall for covering the coil spring.

4. The tie-down device according to claim 1, wherein the driving unit includes a motor supported on the first wall and operatively connected to the speed-increasing gearbox.

5. The tie-down device according to claim 4, wherein the large gear is operatively connected to the motor.

6. The tie-down device according to claim 5, wherein the motor includes a mandrel connected to the large gear.

7. The tie-down device according to claim 1, wherein the first wall includes an outwardly protrusion portion for receiving the butt.

8. The tie-down device according to claim 1, wherein the gearbox includes a shell attached to the first wall for shielding the small and large gears.

9. A tie-down device including:
   a frame including a base and first and second walls extending from the base;
   a strap;
   a reeling unit including a reel rotationally supported on the first and second walls for reeling the strap;
   a driving unit supported on the first wall; and
   a speed-increasing gearbox including:
      a small gear connected to the reel so that they are rotatable together;
      a large gear engaged with the small gear and connected to the driving unit; and
      a medium gear provided between the small and large gears.

\* \* \* \* \*